US007751965B2

(12) United States Patent
Ando et al.

(10) Patent No.: US 7,751,965 B2
(45) Date of Patent: Jul. 6, 2010

(54) HYBRID VEHICLE AND CONTROL METHOD OF HYBRID VEHICLE

(75) Inventors: Daigo Ando, Nisshin (JP); Fumikazu Satou, Toyota (JP); Takeshi Kanayama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 11/991,004

(22) PCT Filed: Nov. 2, 2006

(86) PCT No.: PCT/JP2006/321993

§ 371 (c)(1),
(2), (4) Date: Feb. 26, 2008

(87) PCT Pub. No.: WO2007/052758

PCT Pub. Date: May 10, 2007

(65) Prior Publication Data

US 2009/0259391 A1 Oct. 15, 2009

(30) Foreign Application Priority Data

Nov. 7, 2005 (JP) .............................. 2005-322617

(51) Int. Cl.
G06F 19/00 (2006.01)
F02N 11/00 (2006.01)
B60W 10/06 (2006.01)
B60W 10/08 (2006.01)

(52) U.S. Cl. .................. 701/113; 123/179.3; 180/65.28; 180/65.285; 903/905; 903/906

(58) Field of Classification Search ............... 123/179.3, 123/179.4; 701/101–103, 112, 113; 180/65.21, 180/65, 28, 65.285; 903/905, 906, 930
See application file for complete search history.

(56) References Cited

U.S. PATENT DOCUMENTS 5,967,940 A 10/1999 Yamaguchi (Continued)

FOREIGN PATENT DOCUMENTS

JP A 08-126115 5/1996

(Continued)

*Primary Examiner*—Willis R Wolfe, Jr.
(74) *Attorney, Agent, or Firm*—Oliff & Berridge, PLC

(57) ABSTRACT

When a start command of an engine is given in the presence of the driver's power demand, the start control sets the ignition timing of the engine to a power demand ignition timing, in order to enable quick output of a large power from the engine in response to the driver's power demand. When the start command of the engine is given in the absence of the driver's power demand in a vehicle drive state, there is little possibility of the occurrence of gear chattering noise because of application of a torque to a driveshaft. The start control accordingly sets the ignition timing of the engine to a vibration control ignition timing, in order to reduce the vibration of the vehicle body. When the start command of the engine is given in the absence of the driver's power demand in a vehicle stop state, on the other hand, application of a small torque may cause the occurrence of chattering noise. The start control accordingly sets the ignition timing of the engine to a chattering control ignition timing, in order to generate a certain level of torque that prevents repeated contact and separation of gears in a gear mechanism even in the event of an engine-induced torque variation.

14 Claims, 9 Drawing Sheets

U.S. PATENT DOCUMENTS

| | | | |
|---|---|---|---|
| 6,807,476 B2 * | 10/2004 | Ando et al. | 701/110 |
| 7,150,254 B2 * | 12/2006 | Ichimoto et al. | 123/179.4 |
| 2003/0154945 A1 * | 8/2003 | Ando et al. | 123/179.3 |
| 2005/0216176 A1 * | 9/2005 | Ichimoto et al. | 701/112 |
| 2006/0150937 A1 * | 7/2006 | Lupo et al. | 123/179.4 |
| 2009/0030595 A1 * | 1/2009 | Sugai | 701/112 |
| 2009/0256513 A1 * | 10/2009 | Ando et al. | 701/113 |

FOREIGN PATENT DOCUMENTS

| | | |
|---|---|---|
| JP | A 11-093725 | 4/1999 |
| JP | A 2004-011650 | 1/2004 |
| JP | A 2005-232993 | 9/2005 |

\* cited by examiner

HYBRID VEHICLE AND CONTROL METHOD OF HYBRID VEHICLE

TECHNICAL FIELD

The present invention is related to a hybrid vehicle and a control method of the hybrid vehicle.

BACKGROUND ART

In a generally known mechanism of the hybrid vehicle, power is transmitted between an internal combustion engine, a generator, and a motor that are interlinked via a planetary gear mechanism. For example, in the hybrid vehicle disclosed in Patent Document 1, in response to requirement for a start of the internal combustion engine in a motor drive mode with the motor driven with electric power discharged from a battery in the operation stop state of the internal combustion engine, the ignition timing of the internal combustion engine is delayed to reduce the output torque of the internal combustion engine. This control aims to reduce the occurrence of vibration of the vehicle body due to an abrupt increase in output of the internal combustion engine.
Patent Document 1: Japanese Patent Laid-Open No. 2004-11650

DISCLOSURE OF THE INVENTION

Excess reduction of the output torque at the start of the internal combustion engine may, however, lead to the occurrence of gear chattering noise in the planetary gear mechanism in response to an internal combustion engine-induced torque variation (for example, a torque variation caused by the repeated cycle of intake, compression, expansion, and exhaust or a torque variation due to unstable combustion at a low torque level). The gear chattering noise may similarly occur in a gear mechanism of a transmission located between the planetary gear mechanism and the axle of the vehicle.

An object of the present invention is to provide a hybrid vehicle and a control method of the hybrid vehicle that prevent the occurrence of gear chattering noise in a gear mechanism at a start of an internal combustion engine. Another object of the present invention is to provide a hybrid vehicle and a control method of the hybrid vehicle that adequately reduce the vibration of the vehicle body and the gear chattering noise at a start of the internal combustion engine according to the driving state of the hybrid vehicle.

At least part of the above and the other related demands is attained by a hybrid vehicle and its control method having the configurations discussed below.

According to one aspect, the present invention is directed to a first hybrid vehicle having: an internal combustion engine that outputs power to a driveshaft linked with an axle of the vehicle; a motoring assembly that is connected to an output shaft of the internal combustion engine via a gear mechanism and motors the internal combustion engine with input and output of torques from and to the driveshaft; a motor that inputs and outputs power from and to the driveshaft; a driveshaft rotation status detector that detects a rotation status of the driveshaft; a power demand detector that detects presence or absence of a driver's power demand; and a start controller that, when a start command of the internal combustion engine is given in the absence of the driver's power demand in a rotation stop state of the driveshaft, controls the internal combustion engine, the motoring assembly, and the motor to bring the internal combustion engine into a state of complete explosion and combustion with setting a starting torque of the internal combustion engine to a preset level of chattering control torque in motoring the internal combustion engine by the motoring assembly and to terminate the motoring of the internal combustion engine by the motoring assembly after the complete explosion and combustion in the internal combustion engine.

When the start command of the internal combustion engine is given in the absence of the driver's power demand in the rotation stop state of the driveshaft, the first hybrid vehicle according to this aspect of the invention starts the operation of the internal combustion engine in motoring the internal combustion engine by the motoring assembly. Under such conditions, the internal combustion engine is brought into the state of complete explosion and combustion while the starting torque of the internal combustion engine is set to the preset level of chattering control torque. This arrangement effectively prevents the occurrence of gear chattering noise in the gear mechanism that links the output shaft of the internal combustion engine with the motoring assembly.

According to another aspect, the invention is directed to a second hybrid vehicle having: an internal combustion engine that outputs power to a driveshaft linked with an axle of the vehicle; a motoring assembly that is connected to an output shaft of the internal combustion engine via a gear mechanism and motors the internal combustion engine with input and output of torques from and to the driveshaft; a motor that inputs and outputs power from and to the driveshaft; a driveshaft rotation status detector that detects a rotation status of the driveshaft; a power demand detector that detects presence or absence of a driver's power demand; and a start controller. When a start command of the internal combustion engine is given in the absence of the driver's power demand in a rotating state of the driveshaft, the start controller controls the internal combustion engine, the motoring assembly, and the motor to bring the internal combustion engine into a state of complete explosion and combustion with setting a starting torque of the internal combustion engine to a preset level of sufficiently small torque in motoring the internal combustion engine by the motoring assembly and to terminate the motoring of the internal combustion engine by the motoring assembly after the complete explosion and combustion in the internal combustion engine. When the start command of the internal combustion engine is given in the absence of the driver's power demand in a rotation stop state of the driveshaft, the start controller controls the internal combustion engine, the motoring assembly, and the motor to bring the internal combustion engine into the state of complete explosion and combustion with setting the starting torque of the internal combustion engine to a chattering control torque, which is greater than the sufficiently small torque, in motoring the internal combustion engine by the motoring assembly and to terminate the motoring of the internal combustion engine by the motoring assembly after the complete explosion and combustion in the internal combustion engine.

When the start command of the internal combustion engine is given in the absence of the driver's power demand in the rotating state of the driveshaft, the second hybrid vehicle according to this aspect of the invention starts the operation of the internal combustion engine in motoring the internal combustion engine by the motoring assembly. In the rotating state of the driveshaft, there is little possibility of the occurrence of gear chattering noise in the gear mechanism. Under such conditions, the internal combustion engine is brought into the state of complete explosion and combustion while the starting torque of the internal combustion engine is set to the preset level of sufficiently small torque. This arrangement effectively reduces the vibration of the vehicle body at the start of the internal combustion engine. When the start command of the internal combustion engine is given in the absence of the driver's power demand in the rotation stop state of the driveshaft, on the other hand, the second hybrid vehicle according to this aspect of the invention starts the operation of the internal combustion engine in motoring the internal combustion engine by the motoring assembly. Under such conditions, the internal combustion engine is brought into the state of complete explosion and combustion while the starting torque of the internal combustion engine is set to the chattering control noise that is greater than the sufficiently small torque. Such setting desirably interferes with the repeated contact and separation between the teeth of the gears in the gear mechanism that links the output shaft of the internal combustion engine with the motoring assembly. This arrangement adequately reduces the vibration of the vehicle body and the gear chattering noise at the start of the internal combustion engine according to the driving state of the hybrid vehicle.

In one preferable application of either the first hybrid vehicle or the second hybrid vehicle according to the invention, the start controller adopts a specific torque level that prevents repeated contact and separation between teeth of gears in the gear mechanism in response to an internal combustion engine-induced torque variation, as the chattering control torque. This arrangement effectively prevents the occurrence of gear chattering noise in the gear mechanism even in the event of an internal combustion engine-induced torque variation.

In one preferable application of the second hybrid vehicle according to the invention, the start controller adopts a specific torque level that is closer to the sufficiently small torque and prevents repeated contact and separation between teeth of gears in the gear mechanism in response to an internal combustion engine-induced torque variation, as the chattering control torque. This arrangement desirably reduces the gear chattering noise, while minimizing the vibration of the vehicle body at the start of the internal combustion engine.

In one preferable embodiment of the second hybrid vehicle, the start controller controls the internal combustion engine to adopt a most delayed ignition timing as an ignition timing of the internal combustion engine, so as to set the starting torque of the internal combustion engine to the sufficiently small torque. The start controller controls the internal combustion engine to adopt a most delayed ignition timing as an ignition timing of the internal combustion engine, so as to set the starting torque of the internal combustion engine to the sufficiently small torque, and the start controller controls the internal combustion engine to advance the ignition timing of the internal combustion engine from the most delayed ignition timing, so as to set the starting torque of the internal combustion engine to the chattering control torque.

In another preferable application of either the first hybrid vehicle or the second hybrid vehicle according to the invention, when the start command of the internal combustion engine is given in the presence of the driver's power demand, the start controller controls the internal combustion engine, the motoring assembly, and the motor to bring the internal combustion engine into the state of complete explosion and combustion with setting the starting torque of the internal combustion engine to a specific torque exceeding the chattering control torque in motoring the internal combustion engine by the motoring assembly and to terminate the motoring of the internal combustion engine by the motoring assembly after the complete explosion and combustion in the internal combustion engine. In the presence of the driver's power demand, the priority is given to quick output of a large torque from the internal combustion engine over reduction of the vibration of the vehicle body and the gear chattering noise in the gear mechanism at the start of the internal combustion engine. This arrangement ensures a good response to the driver's power demand.

In still another preferable application of either the first hybrid vehicle or the second hybrid vehicle according to the invention, the start controller controls the starting torque of the internal combustion engine according to an ignition timing of the internal combustion engine. The control of the starting torque is also attainable by regulating the intake air flow. The control of the starting torque by regulating the ignition timing is, however, generally easier and quicker and is thus preferable.

In one preferable structure of either the first hybrid vehicle or the second hybrid vehicle according to the invention, the motoring assembly has: a three shaft-type power input output mechanism that is linked to three shafts, the output shaft of the internal combustion engine, the driveshaft, and a third shaft, and inputs and outputs power from and to a residual one shaft based on powers input from and output to any two shafts among the three shafts, as the gear mechanism; and a generator that inputs and outputs power from and to the third shaft.

According to another aspect, the invention is directed to a first control method of a hybrid vehicle. The hybrid vehicle has: an internal combustion engine that outputs power to a driveshaft linked with an axle of the vehicle; a motoring assembly that is connected to an output shaft of the internal combustion engine via a gear mechanism and motors the internal combustion engine with input and output of torques from and to the driveshaft; and a motor that inputs and outputs power from and to the driveshaft. When a start command of the internal combustion engine is given in absence of a driver's power demand in a rotation stop state of the driveshaft, the control method controls the internal combustion engine, the motoring assembly, and the motor to bring the internal combustion engine into a state of complete explosion and combustion with setting a starting torque of the internal combustion engine to a preset level of chattering control torque in motoring the internal combustion engine by the motoring assembly and to terminate the motoring of the internal combustion engine by the motoring assembly after the complete explosion and combustion in the internal combustion engine.

When the start command of the internal combustion engine is given in the absence of the driver's power demand in the rotation stop state of the driveshaft, the first control method of the hybrid vehicle according to this aspect of the invention starts the operation of the internal combustion engine in motoring the internal combustion engine by the motoring assembly. Under such conditions, the internal combustion engine is brought into the state of complete explosion and combustion while the starting torque of the internal combustion engine is set to the preset level of chattering control torque. This arrangement effectively prevents the occurrence of gear chattering noise in the gear mechanism that links the output shaft of the internal combustion engine with the motoring assembly. Any of various applications and arrangements of the hybrid vehicle described above may also be adopted in the first control method of the hybrid vehicle.

According to still another aspect, the invention is directed to a second control method of a hybrid vehicle. The hybrid vehicle has: an internal combustion engine that outputs power to a driveshaft linked with an axle of the vehicle; a motoring assembly that is connected to an output shaft of the internal combustion engine via a gear mechanism and motors the internal combustion engine with input and output of torques from and to the driveshaft; and a motor that inputs and outputs power from and to the driveshaft. When a start command of the internal combustion engine is given in absence of a driver's power demand in a rotating state of the driveshaft, the control method controlling the internal combustion engine, the motoring assembly, and the motor to bring the internal combustion engine into a state of complete explosion and combustion with setting a starting torque of the internal combustion engine to a preset level of sufficiently small torque in motoring the internal combustion engine by the motoring assembly and to terminate the motoring of the internal combustion engine by the motoring assembly after the complete explosion and combustion in the internal combustion engine. When the start command of the internal combustion engine is given in the absence of the driver's power demand in a rotation stop state of the driveshaft, the control method controlls the internal combustion engine, the motoring assembly, and the motor to bring the internal combustion engine into the state of complete explosion and combustion with setting the starting torque of the internal combustion engine to a chattering control torque, which is greater than the sufficiently small torque, in motoring the internal combustion engine by the motoring assembly and to terminate the motoring of the internal combustion engine by the motoring assembly after the complete explosion and combustion in the internal combustion engine.

When the start command of the internal combustion engine is given in the absence of the driver's power demand in the rotating state of the driveshaft, the second control method of the hybrid vehicle according to this aspect of the invention starts the operation of the internal combustion engine in motoring the internal combustion engine by the motoring assembly. In the rotating state of the driveshaft, there is little possibility of the occurrence of gear chattering noise in the gear mechanism. Under such conditions, the internal combustion engine is brought into the state of complete explosion and combustion while the starting torque of the internal combustion engine is set to the preset level of sufficiently small torque. This arrangement effectively reduces the vibration of the vehicle body at the start of the internal combustion engine. When the start command of the internal combustion engine is given in the absence of the driver's power demand in the rotation stop state of the driveshaft, on the other hand, the second control method of the hybrid vehicle according to this aspect of the invention starts the operation of the internal combustion engine in motoring the internal combustion engine by the motoring assembly. Under such conditions, the internal combustion engine is brought into the state of complete explosion and combustion while the starting torque of the internal combustion engine is set to the chattering control noise that is greater than the sufficiently small torque. This interferes with the repeated contact and separation between the teeth of the gears in the gear mechanism that links the output shaft of the internal combustion engine with the motoring assembly. This arrangement adequately reduces the vibration of the vehicle body and the gear chattering noise at the start of the internal combustion engine according to the driving state of the hybrid vehicle. Any of various applications and arrangements of the hybrid vehicle described above may also be adopted in the second control method of the hybrid vehicle.

DESCRIPTION OF THE PREFERRED EMBODIMENTS

One mode of carrying out the invention is discussed below as a preferred embodiment with reference to the accompanied drawings.

Figure 1:
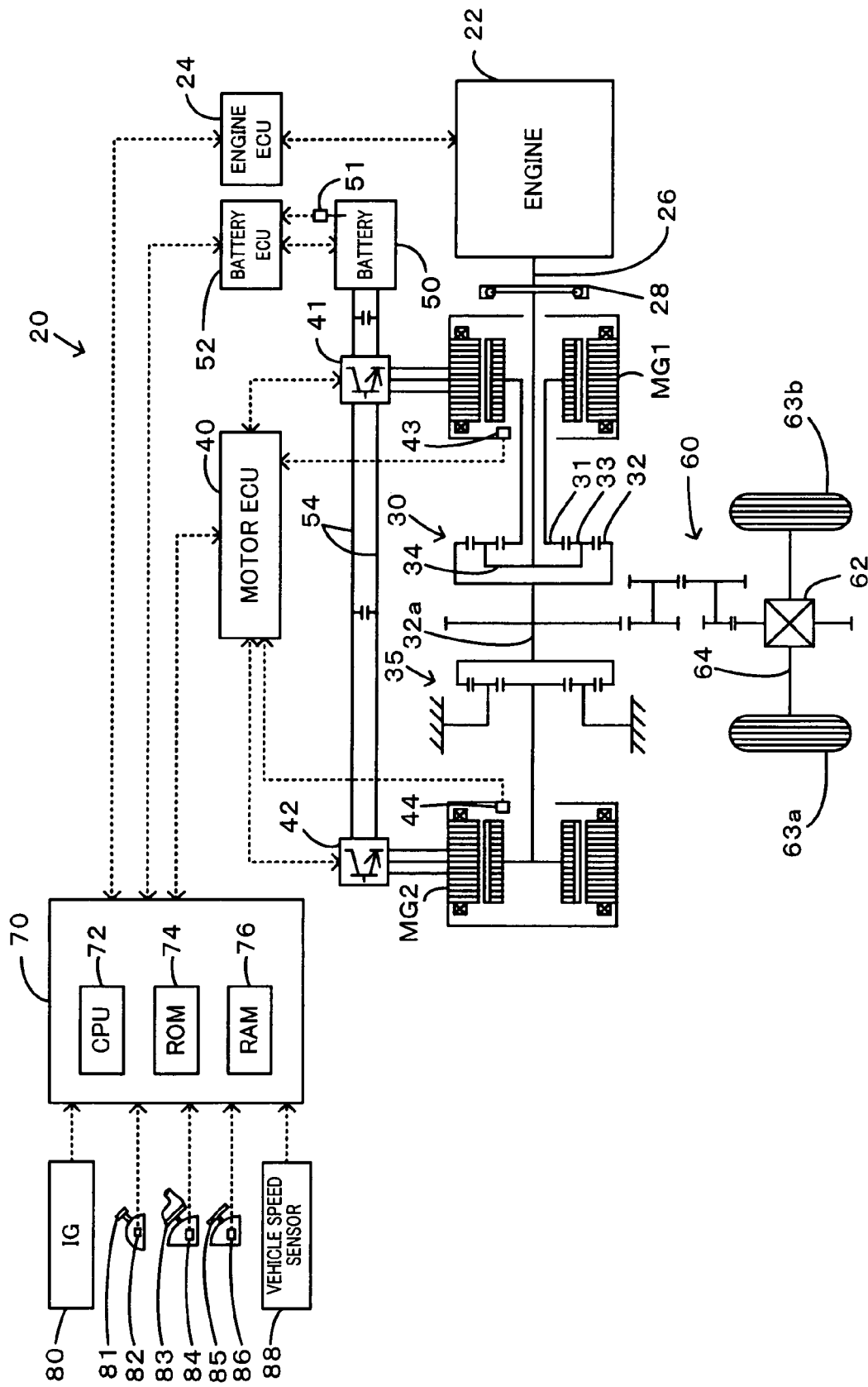
FIG. 1 schematically illustrates the configuration of a hybrid vehicle 20 in one embodiment of the invention.

FIG. 1 schematically illustrates the configuration of a hybrid vehicle 20 equipped with a power output apparatus in one embodiment of the invention. As illustrated, the hybrid vehicle 20 of the embodiment includes an engine 22, a planetary gear mechanism 30 having a carrier 34 that rotates a pinion gear 33 and is linked to a crankshaft 26 or an output shaft of the engine 22 via a damper 28, a motor MG1 that is linked to a sun gear 31 of the planetary gear mechanism 30 and has power generation capability, a motor MG2 that is linked via a reduction gear 35 to a ring gear shaft 32a or a driveshaft connecting with a ring gear 32 of the planetary gear mechanism 30, and a hybrid electronic control unit 70 that functions as total control means for controlling the operations of the whole power output apparatus on the hybrid vehicle 20. The ring gear shaft 32a or the driveshaft is linked to an axle 64 provided with drive wheels 63a and 63b via a gear mechanism 60 and a differential gear 62. The output power to the ring gear shaft 32a is used as driving power of the hybrid vehicle 20.

Figure 2:
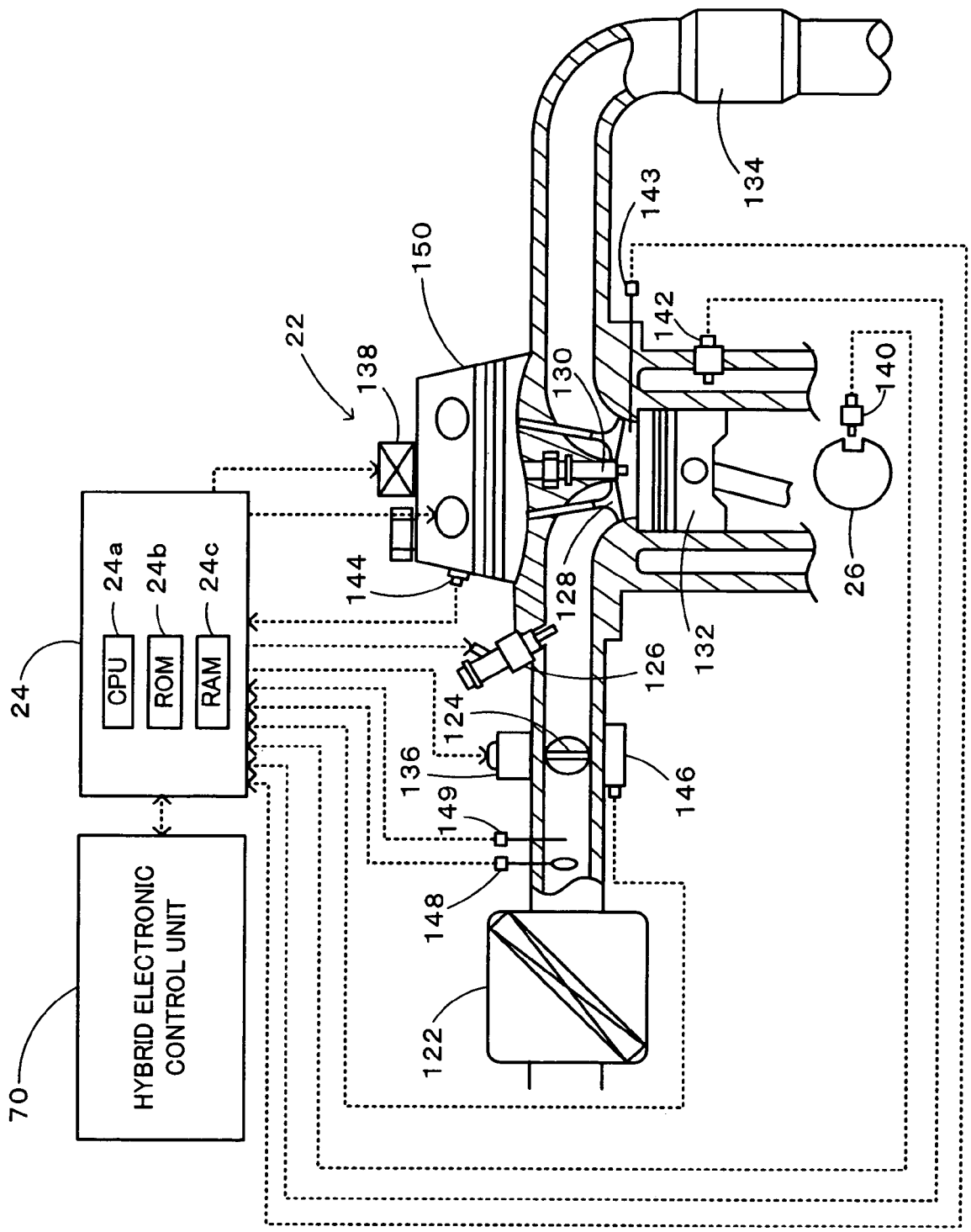
FIG. 2 shows the schematic structure of an engine 22 mounted on the hybrid vehicle.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24. The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, signals from various sensors that measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure Pin from a pressure sensor 143 attached to a combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the position of the throttle valve 124, an air flow meter signal AF from an air flow meter 148 attached to an air intake conduit, and an intake air temperature from a temperature sensor 149 attached to the air intake conduit. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The motors MG1 and MG2 are constructed as known synchronous motor generators that may be actuated both as a generator and as a motor. The motors MG1 and MG2 transmit electric powers to and from a battery 50 via inverters 41 and 42. Both the motors MG1 and MG2 are driven and controlled by a motor electronic control unit (hereafter referred to as motor ECU) 40. The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in a power line 54 connecting with an output terminal of the battery 50, and a battery temperature Tb from a temperature sensor 51 attached to the battery 50. The battery ECU 52 computes a remaining charge level or current state of charge (SOC) of the battery 50 for the purpose of management of the battery 50, while calculating a charge-discharge power demand Pb* required to charge the battery 50 or to be discharged from the battery 50, based on the computed state of charge (SOC), the input battery temperature Tb, and input and output limits Win and Wout of the battery 50. The battery ECU 52 outputs these computation results and other data to the hybrid electronic control unit 70 by communication, according to the requirements.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52 as mentioned above.

The hybrid vehicle 20 of the embodiment constructed as described above sets a torque demand to be output to the ring gear shaft 32a or the driveshaft, based on the vehicle speed V and the accelerator opening Acc (corresponding to the driver's depression amount of the accelerator pedal 83), and drives and controls the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by means of the planetary gear mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by means of the planetary gear mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 3:
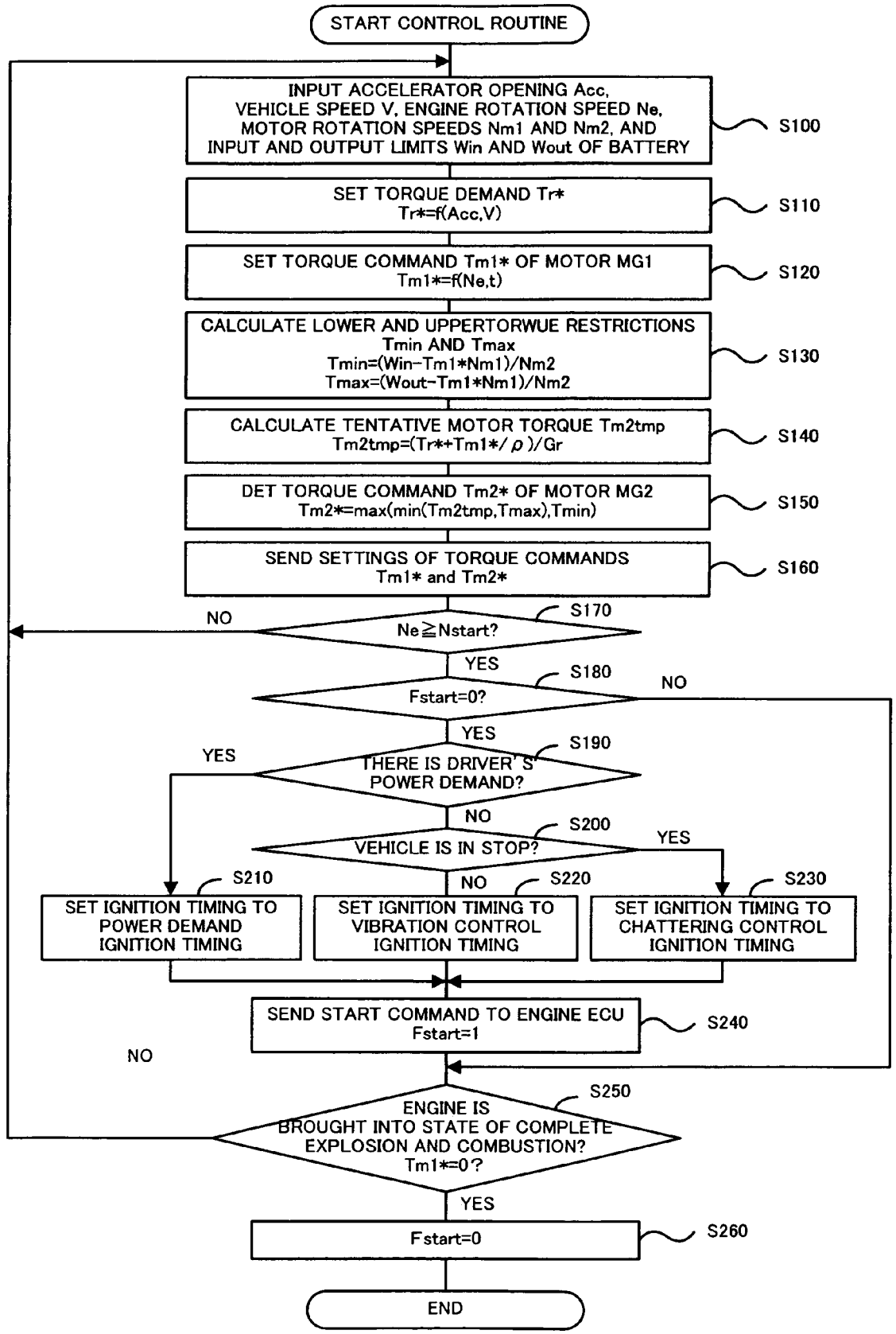
FIG. 3 is a flowchart showing a start control routine executed by a hybrid electronic control unit.
Figure 4:
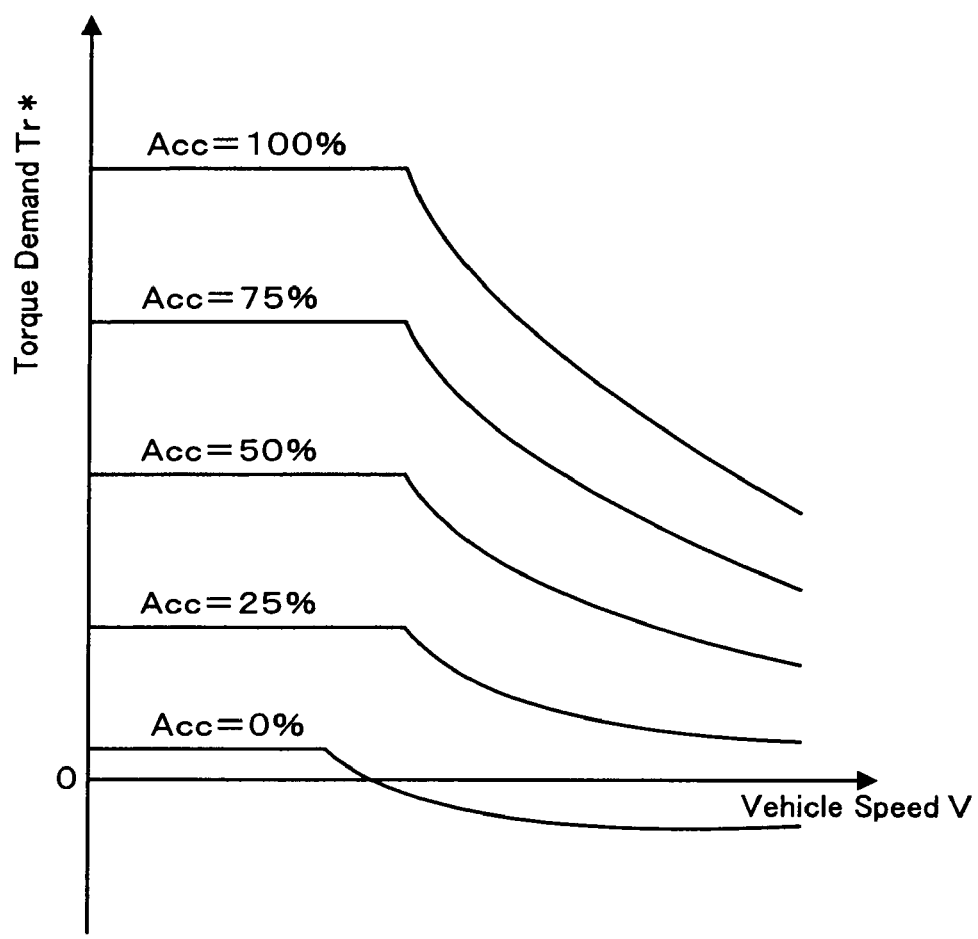
FIG. 4 shows one example of a torque demand setting map.

The description regards the operations of the hybrid vehicle 20 of the embodiment having the configuration discussed above, especially a series of operations in response to a start command of the engine 22 in an operation stop state of the engine 22. FIG. 3 is a flowchart showing a start control routine executed by the hybrid electronic control unit 70, in response to a start command of the engine 22. The start command of the engine 22 is given in the operation stop state of the engine 22, for example, when an engine power demand Pe* required for the engine 22 exceeds a preset reference value Pref during drive of the hybrid vehicle 20 in a motor drive mode or when warm-up of the engine 22 and charging of the battery 50 are required immediately after system activation in a vehicle stop state. The motor drive mode is described briefly. The reference value Pref is used as a criterion for identifying the presence or the absence of a start command of the engine 22 and is set close to a minimum power limit in a relatively efficient operation range of the engine 22. The engine power demand Pe* is calculated from a driveshaft power demand Pr* that is to be output to the ring gear shaft 32a or the driveshaft, a charge-discharge power demand Pb* that is to be charged into the battery 50 or to be discharged from the battery 50 (discharging power is expressed by positive values and charging power is expressed by negative values), and a potential loss according to Equation (1) given below. The engine power demand Pe* exceeds the preset reference value Pref, for example, when the driver steps relatively deeply on the accelerator pedal 83 in a relatively sufficient state of charge (SOC) of the battery 50, when the vehicle speed V increases to raise a rotation speed Nr of the ring gear shaft 32a without the driver's depression of the accelerator pedal 83 in the relatively sufficient state of charge (SOC) of the battery 50, or when the state of charge (SOC) of the battery 50 is lowered and a large value (charging power) is set to the charge-discharge power demand Pb* without the driver's depression of the accelerator pedal 83 at the low vehicle speed V and the low rotation speed Nr of the ring gear shaft 32a. The driveshaft power demand Pr* is calculated by multiplying a torque demand Tr* required for the ring gear shaft 32a by the rotation speed Nr of the ring gear shaft 32a according to Equation (2) given below. The torque demand Tr* is set corresponding to the accelerator opening Acc input from the accelerator pedal position sensor 84 and the vehicle speed V input from the vehicle speed sensor 88 by referring to a torque demand setting map (see FIG. 4) stored in the ROM 74. The rotation speed Nr of the ring gear shaft 32a is calculated by dividing a rotation speed Nm2 of the motor MG2 by a gear ratio Gr of the reduction gear 35 as shown in Equation (2) given below. The rotation speed Nm2 of the motor MG2 is obtained according to the rotational position of the rotor in the motor MG2 detected by the rotational position detection sensor 44. In the motor drive mode, a rotation speed Ne of the engine 22 and a torque Tm1 of the motor MG1 are both equal to 0.

$$Pe^* = Pr^* - Pb^* + \text{Loss} \quad (1)$$

$$Pr^* = Tr^* \cdot Nm2/Gr \quad (2)$$

On the start of the start control routine of FIG. 3, the CPU 72 of the hybrid electronic control unit 70 first inputs data required for control, that is, the accelerator opening Acc from the accelerator pedal position sensor 84, the vehicle speed V from the vehicle speed sensor 88, the rotation speed Ne of the engine 22, rotation speeds Nm1 and Nm2 of the motors MG1 and MG2, and an input limit Win and an output limit Wout of the battery 50 (step S100). The CPU 72 subsequently sets the torque demand Tr* corresponding to the input accelerator opening Acc and the input vehicle speed V by referring to the torque demand setting map shown in FIG. 4 (step S110). The rotation speed Ne of the engine 22 is computed from the output signal of the crank position sensor 140 attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the state of charge SOC of the battery 50 and is received from the battery ECU 52 by communication.

Figure 5:
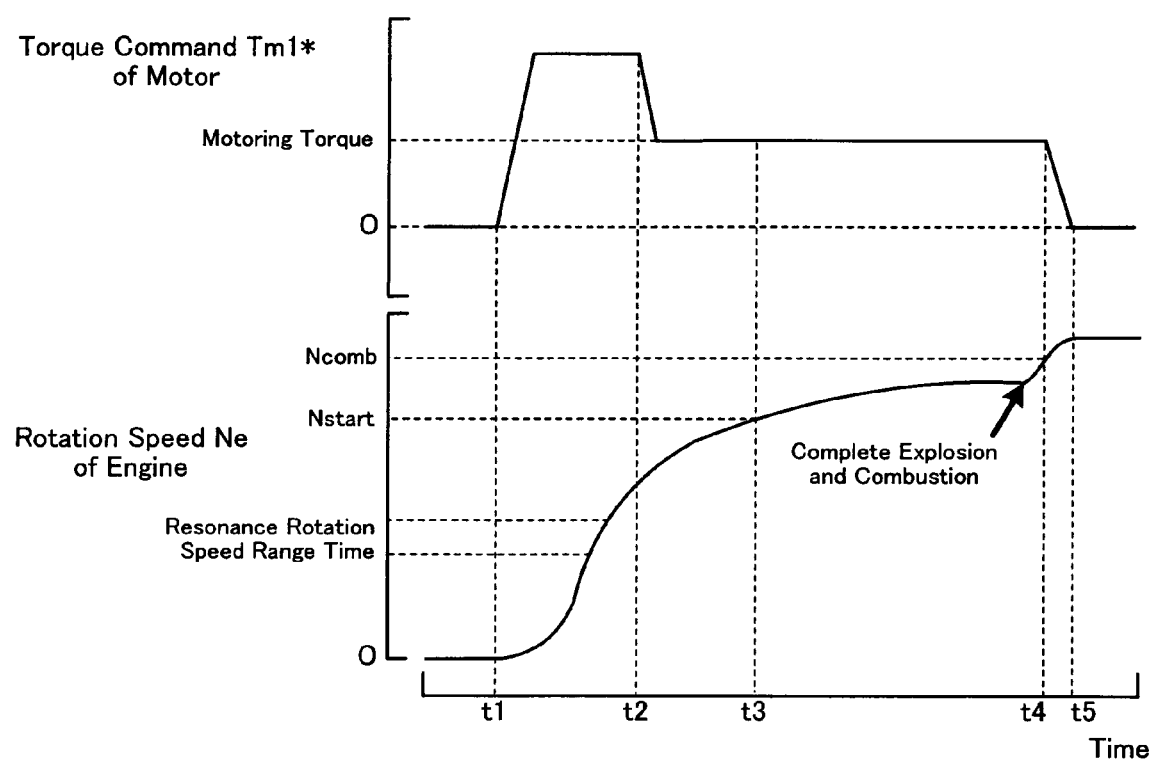
FIG. 5 is a map showing a variation in torque command $Tm1^*$ of a motor MG1 at a start of the engine 22 against the rotation speed Ne of the engine 22 and the elapsed time t since the beginning of the engine start operation.

The CPU 72 then sets a torque command Tm1* of the motor MG1 corresponding to the rotation speed Ne of the engine 22 and an elapsed time t since the beginning of the engine start operation by referring to an engine start map (step S120). The engine start map represents a variation in torque command Tm1* of the motor MG1 at the start of the engine 22 against the rotation speed Ne of the engine 22 and the elapsed time t since the beginning of the engine start operation. One example of the engine start map is shown in FIG. 5. As shown in the map of FIG. 5, immediately after a time point t1 when a start command of the engine 22 is given, the torque command Tm1* is set to a relatively large torque by the rate processing, in order to quickly increase the rotation speed Ne of the engine 22. Immediately after a time point t2 when the rotation speed Ne of the engine 22 has reached or exceeded a resonance rotation speed range or is expected to reach or exceed the resonance rotation speed range, the torque command Tm1* is set to a motoring torque that ensures stable motoring of the engine 22 at a rotation speed of not lower than an ignition start rotation speed Nstart. Such setting aims to reduce the power consumption and the reactive force applied on the ring gear shaft 32a or the driveshaft. In the start control routine of this embodiment, the ignition start rotation speed Nstart is set to a marginally higher rotation speed (for example, 1000 rpm) than the resonance rotation speed range. The torque command Tm1* is kept to the motoring torque, while the rotation speed Ne of the engine 22 exceeds the ignition start rotation speed Nstart at a time point t3 and reaches a combustion rotation speed Ncomb at a time point t4. The rotation speed Ne of the engine 22 reaches or exceeds the combustion rotation speed Ncomb only after the engine 22 is brought into the state of complete explosion and combustion. The rating process starts at the time point t4 to quickly decrease the torque command Tm1* to 0 at a time point t5. The torque command Tm1* of the motor MG1 is kept equal to 0 for the subsequent self-sustained operation of the engine 22, while being set to a negative torque for the subsequent power generation by the motor MG1. This control procedure sets a sufficiently large torque to the torque command Tm1* of the motor MG1 immediately after the start command of the engine 22 and motors the engine 22. The rotation speed Ne of the engine 22 thus quickly increases to or above the ignition start rotation speed Nstart to start the operation of the engine 22.

After setting the torque command Tm1* of the motor MG1, the CPU 72 calculates a lower torque restriction Tmin and an upper torque restriction Tmax as minimum and maximum torques that may be output from the motor MG2, according to Equations (3) and (4) given below (step S130). The lower torque restriction Tmin and the upper torque restriction Tmax are given by dividing a difference between the input limit Win or output limit Wout of the battery 50 and power consumption (power generation) of the motor MG1, which is the product of the torque command Tm1* and the input current rotation speed Nm1 of the motor MG1, by the input current rotation speed Nm2 of the motor MG2. The CPU 72 then calculates a tentative motor torque Tm2tmp to be output from the motor MG2 from the torque demand Tr*, the torque command Tm1* of the motor MG1, and a gear ratio ρ of the planetary gear mechanism 30, according to Equation (5) given below (step S140). The CPU 72 limits the tentative motor torque Tm2tmp to the range between the calculated lower torque restriction Tmin and upper torque restriction Tmax to set a torque command Tm2* of the motor MG2 (step S150). The CPU 72 accordingly sends the settings of the torque commands Tm1* and Tm2* of the motors MG1 and MG2 to the motor ECU 40 (step S160). Setting the torque command Tm1* of the motor MG1 and the torque command Tm2* of the motor MG2 in this manner enables output of the torque demand Tr* to the ring gear shaft 32a or the driveshaft as the restricted torque within the range of the input limit Win and the output limit Wout of the battery 50, while cranking the engine 22. Equation (5) is obtained from an alignment chart shown in FIG. 6 which will described later. The motor ECU 40 receives the settings of the torque commands Tm1* and Tm2* and performs switching control of the switching elements included in the respective inverters 41 and 42 to drive the motor MG1 with the torque command Tm1* and the motor MG2 with the torque command Tm2*.

$$Tmin = (Win - Tm1^* \cdot Nm1)/Nm2 \quad (3)$$

$$Tmax = (Wout - Tm1^* \cdot Nm1)/Nm2 \quad (4)$$

$$Tm2tmp = (Tr^* + Tm1^*/\rho)/Gr \quad (5)$$

It is then determined whether the rotation speed Ne of the engine 22 has reached the ignition start rotation speed Nstart (step S170). When the rotation speed Ne of the engine 22 has not yet reached the ignition start rotation speed Nstart, the start control routine goes back to step S101 and repeats the processing of steps S101 to S170 until the rotation speed Ne of the engine 22 reaches the ignition start rotation speed Nstart. When the rotation speed Ne of the engine 22 has reached the ignition start rotation speed Nstart, it is then identified whether a start command flag Fstart is equal to 0 (step S180). The start command flag Fstart is used to identify the output or the non-output of a start command to the engine 22. The start command flag Fstart equal to 0 represents non-output of the start command to the engine 22, whereas the start command flag Fstart equal to 1 represents output of the start command to the engine 22. It is here assumed that the rotation speed Ne of the engine 22 has just reached the ignition start rotation speed Nstart at step S170. In this case, the CPU 72 identifies the start command flag Fstart as 0 at step S180 and proceeds to the processing of and after step S190. It is successively determined whether there is the driver's power demand (step S190) and whether the hybrid vehicle 20 is in stop (step S200). The ignition timing is determined according to the results of these determinations. A concrete procedure of determining the presence or the absence of the driver's power demand in the embodiment calculates a difference between a current torque demand Tr* set in the current cycle of the start control routine and a previous torque demand Tr* set in the previous cycle and determines the presence of the driver's power demand in response to the calculated difference exceeding a preset reference torque level. The reference torque level may be set equal to 0 or set to a significantly small value approximate to 0. A concrete procedure of determining the stop status of the hybrid vehicle 20 detects whether the vehicle speed V is equal to 0.

When there is the driver's power demand at step S190, the ignition timing is set to a power demand ignition timing (step S210). The power demand ignition timing is experimentally or otherwise set in advance to substantially maximize the work load in combustion of the air-fuel mixture taken into and compressed in the engine 22. Such torque setting ensures a quick response to the driver's power demand. When there is no driver's power demand but when the hybrid vehicle 20 is not in stop, the ignition timing is set to a vibration control ignition timing (step S220). The vibration control ignition timing is experimentally or otherwise set in advance to generate a minimum torque of ensuring continuous firing of the air-fuel mixture after complete explosion and combustion in the engine 22 or a sufficiently small torque close to the minimum torque. In the start control routine of this embodiment, the vibration control ignition timing is a most delayed ignition timing. Such torque setting is due to the following reason. In the hybrid vehicle 20 that is not in stop but is driven in the motor drive mode, because of application of a torque to the ring gear shaft 32a or the driveshaft, there is little possibility of the occurrence of gear chattering noise even in the event of a variation in torque output from the engine 22 at the start of the engine 22. In this state, the output torque of the engine 22 is decreased to the lowest possible level, in order to reduce the vibration of the vehicle body. When there is no driver's power demand and when the hybrid vehicle 20 is in stop, on the other hand, the ignition timing is set to a chattering control ignition timing (step S230). The chattering control ignition timing is experimentally or otherwise set in advance to ensure generation of a specific torque (chattering control torque) that prevents the occurrence of gear chattering noise caused by repeated contact and separation between the teeth of the pinion gear 33 and the teeth of the sun gear 31 or between the teeth of the pinion gear 33 and the teeth of the ring gear 32 in the planetary gear mechanism 30 even in the event of a torque variation induced by the repeated cycle of intake, compression, expansion, and exhaust in the engine 22 or in the event of a torque variation due to unstable combustion at a low torque level. Setting the chattering control ignition timing to the ignition timing of the engine 22 causes the generated chattering control torque to be in a chattering suppression range between the sufficiently small torque and the torque generated in response to the driver's power demand and to be closer to the sufficiently small torque. The chattering control ignition timing is delayed from the power demand ignition timing but is advanced from the vibration control ignition timing, while being set to be closer to the vibration control ignition timing. Such torque setting effectively prevents the occurrence of gear chattering noise even in the event of an engine-induced torque variation after the complete explosion and combustion in the engine 22, while minimizing the vibration of the vehicle body.

After setting the ignition timing at any one of steps S210, S220, and S230, the CPU 72 outputs a start command to the engine ECU 22 to perform the ignition control at the set ignition timing for starting the operation of the engine 22, and sets the start command flag Fstart to 1 (step S240). In response to input of the start command, the engine ECU 24 controls the fuel injection valve 126 to inject the fuel of a start-time fuel injection amount computed according to the cooling water temperature and the in-cylinder temperature of the engine 22, while supplying power to the ignition coil 138 at the set ignition timing to fire the air-fuel mixture with an electric spark from the ignition plug 130. The CPU 72 subsequently determines whether the engine 22 is brought into the state of complete explosion and combustion and whether the torque command Tm1* is equal to 0 (step S250). In response to a negative answer at step S250, the start control routine returns to step S100 and repeats the processing of and after step S100. Since the start command flag Fstart is set to 1 in the previous cycle, the negative answer is given at step S180 in the repeated cycle of the processing of and after step S100. In this case, the repeated cycle skips the processing of steps S190 to S240 and proceeds to step S250. When the engine 22 is brought into the state of complete explosion and combustion and when the torque command Tm1* is equal to 0 (at the time point t5 in FIG. 5), it is determined that the start operation of the engine 22 is completed. The CPU 72 then resets the start command flag Fstart to 0 (step S260) and exits from the start control routine. A drive control routine (not shown) is performed after completion of this start control routine to drive the hybrid vehicle 20 in a torque conversion drive mode or in a charge-discharge drive mode with the operations of the engine 22 and the motors MG1 and MG2. The drive control is not characteristic of the present invention and is thus not specifically described here.

Figure 6:
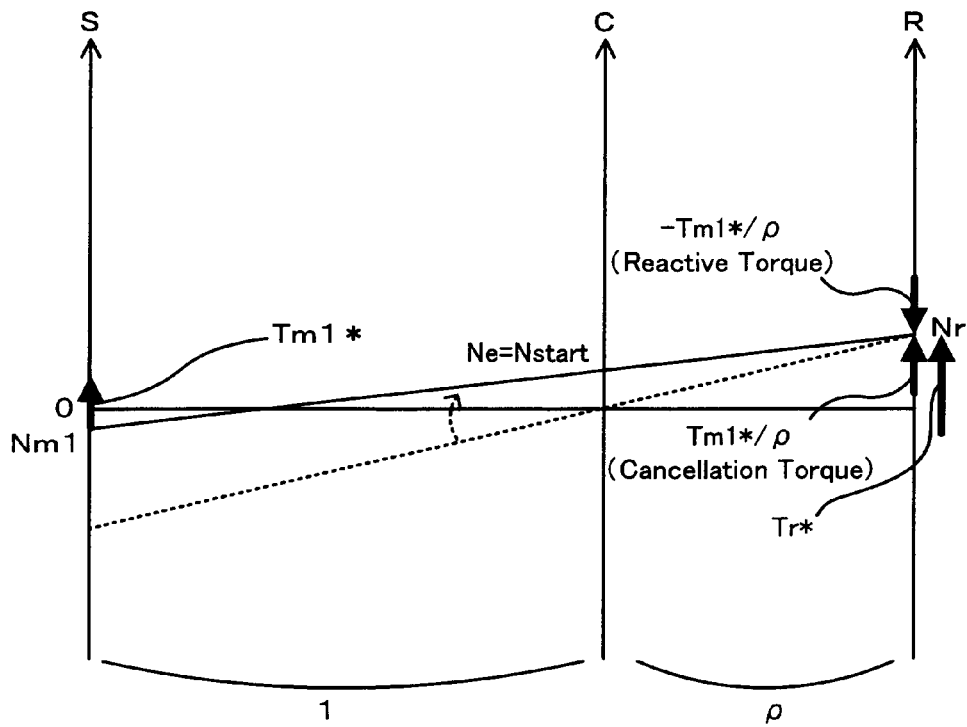
FIG. 6 is an operation alignment chart showing torque-rotation speed dynamics of rotational elements included in a planetary gear mechanism 30 at the output time of a start command of the engine in a motor drive mode.

FIG. 6 is an operation alignment chart at the output time of the start command of the engine 22 during drive of the hybrid vehicle 20 in the motor drive mode. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. During drive of the hybrid vehicle 20 in the motor drive mode, the rotation speed Ne of the engine 22 is equal to 0 as shown by the dotted line. The torque command Tm1* of the motor MG1 is set equal to 0, in order to enable the rotation speed Nm1 of the motor MG1 to follow the given rotation speed Nm2 of the motor MG2. In the motor drive mode, when the driver steps relatively deeply on the accelerator pedal 83 in the relatively sufficient state of charge (SOC) of the battery 50, the start command of the engine 22 is given to motor the engine 22 by means of the motor MG1 and to increase the rotation speed Ne of the engine 22 to the ignition start rotation speed Nstart (see the solid line in FIG. 6). In response to an abrupt increase of the torque demand Tr*, the operation of the engine 22 is controlled to ignite the air-fuel mixture at the power demand ignition timing and to enable prompt power output from the engine 22. In the motor drive mode, the start command of the engine 22 may also be given when the vehicle speed V is increased to raise the rotation speed Nr of the ring gear shaft 32a without the driver's depression of the accelerator pedal 83 in the relatively sufficient state of charge (SOC) of the battery 50 or when the state of charge (SOC) of the battery 50 is lowered and a large value (charging power) is set to the charge-discharge power demand Pb* without the driver's depression of the accelerator pedal 83 at the low vehicle speed V and the low rotation speed Nr of the ring gear shaft 32a. In this case, there is no driver's power demand. The motor MG1 is then controlled to motor the engine 22 and to increase the rotation speed Ne of the engine 22 to the ignition start rotation speed Nstart. The engine 22 is controlled to ignite the air-fuel mixture at the vibration control ignition timing. Such control minimizes the vibration of the vehicle body at the start of the engine 22. In this state, the torque command Tr* is applied to the ring gear shaft 32a or the driveshaft. There is accordingly little possibility of the occurrence of gear chattering noise in the planetary gear mechanism 30 or in the reduction gear 35.

Figure 7:
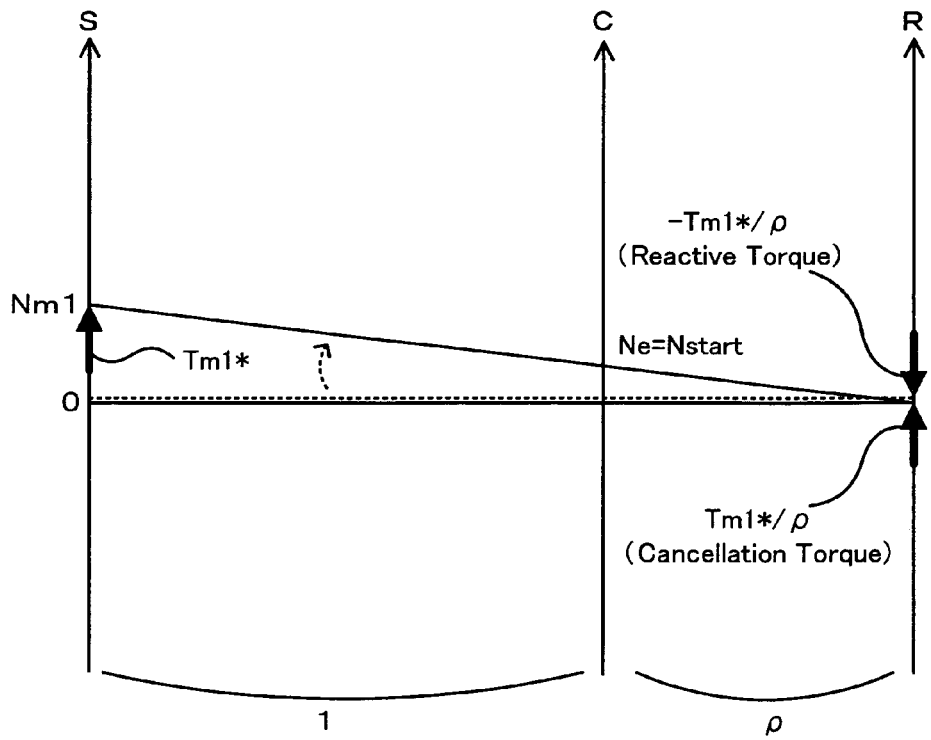
FIG. 7 is an operation alignment chart showing torque-rotation speed dynamics of the rotational elements included in the planetary gear mechanism 30 at the output time of the start command of the engine in a vehicle stop state without the driver's power demand.
Figure 8:
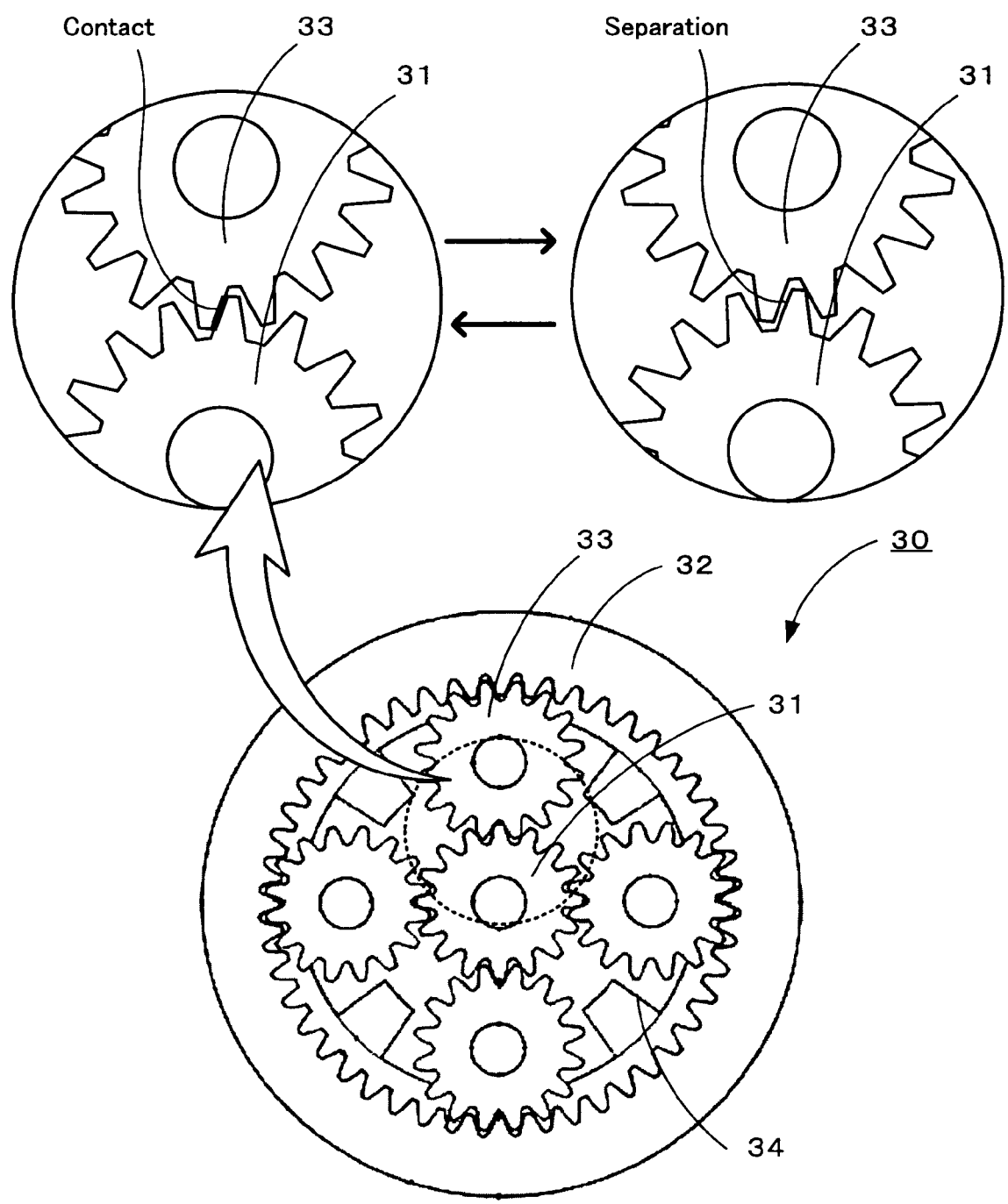
FIG. 8 shows a mechanism of occurrence of gear chattering noise in the planetary gear mechanism 30.

FIG. 7 is an operation alignment chart at the output time of the start command of the engine 22 in the stop state of the hybrid vehicle 20 with operation stop of the engine 22. In the stop state of the hybrid vehicle 20 with operation stop of the engine 22, the rotation speed Nm1 of the motor MG1, the rotation speed Nm2 of the motor MG2, and the rotation speed Ne of the engine 22 are all equal to 0 (see the broken line in FIG. 7). In this state, the start command of the engine 22 is given in response to requirement for warm-up of the engine 22 and charging of the battery 50 at the time of system activation. The torque command Tm1* of the motor MG1 is set equal to 0 at the time point t5 after the complete explosion and combustion in the engine 22 (see FIG. 5). Output of an excessively small torque from the engine 22 may cause an engine-induced torque variation and lead to the occurrence of gear chattering noise caused by the repeated contact and separation between the teeth of the sun gear 31 and the teeth of the pinion gear 33 as shown in FIG. 8. Similarly the engine-induced torque variation may lead to the occurrence of gear chattering noise between the teeth of the ring gear 32 and the teeth of the pinion gear 33. The start control of the embodiment accordingly controls the engine 22 to output a specific level of torque that prevents the repeated contact and separation of the gears. The torque command Tm1* of the motor MG1 is kept equal to 0 for the subsequent sustained operation of the engine 22, while being set to a negative torque for the subsequent power generation by the motor MG1.

As described above, when the start command of the engine 22 is given in the absence of the driver's power demand in the stop state of the hybrid vehicle 20, the hybrid vehicle 20 of the embodiment controls the engine 22 to output the chattering control torque, which is slightly greater than the sufficiently small torque for sufficient suppression of the vibration of the vehicle body. Such torque setting effectively prevents the occurrence of gear chattering noise in the planetary gear mechanism 30 and in the power transmission gear 60. The chattering control torque is closer to the sufficiently small torque in the chattering noise suppression range of preventing the repeated contact and separation of the gears. This arrangement desirably reduces the occurrence of the gear chattering noise, while minimizing the vibration of the vehicle body at the start of the engine 22. When the start command of the engine 22 is given in the absence of the driver's power demand during drive of the hybrid vehicle 20, on the other hand, a certain level of torque is applied to the ring gear shaft 32a or the driveshaft. There is accordingly little possibility of the occurrence of gear chattering noise. The engine 22 is then controlled to output the sufficiently small torque that sufficiently suppresses the vibration of the vehicle body. Such torque setting effectively prevents the driver from being conscious of the vibration of the vehicle body at the start of the engine 22. This arrangement adequately reduces the vibration of the vehicle body and the gear chattering noise at the start of the engine 22 according to the driving state of the hybrid vehicle 20.

When the start command of the engine 22 is given in the presence of the driver's power demand, the start control of the embodiment controls the engine 22 to promptly output a sufficiently large torque, in preference to reduction of the gear chattering noise and the vibration of the vehicle body at the start of the engine 22. This ensures a good response to the driver's power demand.

The embodiment discussed above is to be considered in all aspects as illustrative and not restrictive. There may be many modifications, changes, and alterations without departing from the scope or spirit of the main characteristics of the present invention.

The start control of the embodiment regulates the ignition timing to control the torque output from the engine 22 at the start of the engine 22. One modified procedure of start control may regulate the throttle opening or the intake air flow into the engine 22, instead of the ignition timing. Regulation of the ignition timing is, however, generally easier and quicker than regulation of the intake air flow and is thus preferable.

Figure 9:
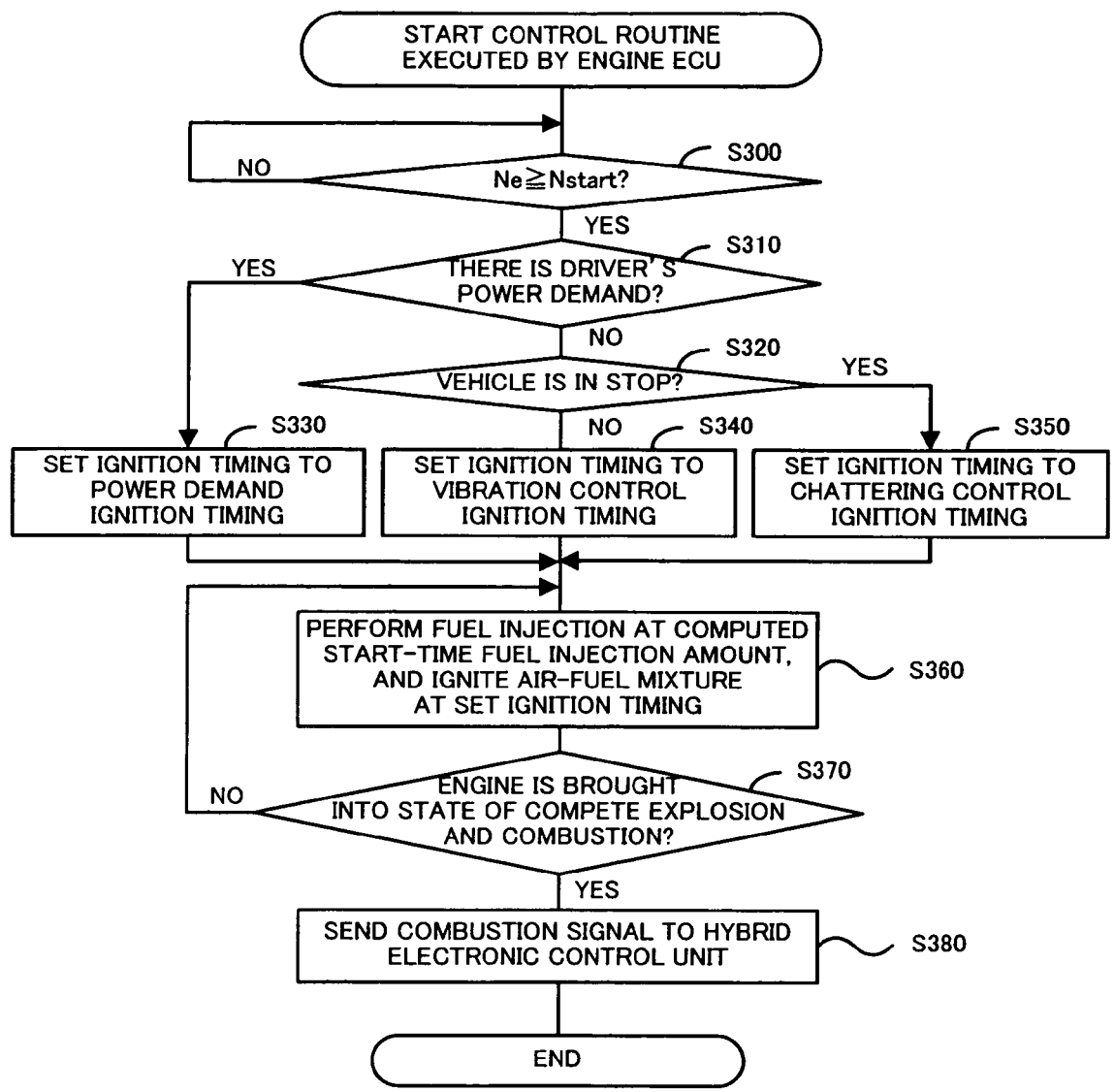
FIG. 9 is a flowchart showing a start control routine executed by an engine ECU as a modified procedure.

In the embodiment described above, the CPU 72 of the hybrid electronic control unit 70 executes the start control routine of FIG. 3 to set the appropriate ignition timing. In one possible modification, when a start command of the engine 22 is output, the hybrid electronic control unit 70 sends the start command to the engine ECU 24. The CPU 24a of the engine ECU 24 receives the start command and executes a start control routine shown in the flowchart of FIG. 9. On the start of the start control routine of FIG. 9, the CPU 24a of the engine ECU 24 successively determines whether there is the driver's power demand and whether the hybrid vehicle 20 is in stop after motoring of the engine 22 increases the rotation speed Ne of the engine 22 to or above the ignition start rotation speed Nstart (steps S300 to S320). The ignition timing is set appropriately according to the results of the determinations, that is, in the presence of the driver's power demand, in the absence of the driver's power demand in the stop state of the hybrid vehicle 20, or in the absence of the driver's power demand during drive of the hybrid vehicle 20 (steps S330 to S350). The processing flow of steps S310 to S350 in the start control routine of FIG. 9 is equivalent to the processing flow of steps S190 to S230 in the start control routine of FIG. 3. The CPU 24a of the engine ECU 24 then controls the fuel injection valve 126 to inject the fuel of a start-time fuel injection amount computed according to the cooling water temperature and the in-cylinder temperature of the engine 22, and ignites the air-fuel mixture with the electric spark from the ignition plug 130 at the ignition timing set at any one of steps S330 to S350 (step S360). When the rotation speed Ne of the engine 22 exceeds the combustion rotation speed Ncomb (step S370), the CPU 24a of the engine ECU 24 outputs a combustion signal to the hybrid electronic control unit 70 (step S380). In this modified application, the hybrid electronic control unit 70 proceeds to step S250 immediately after execution of step S160 in the start control routine of FIG. 3 and repeats the processing flow of steps S100 to S160 and step S250 until reception of the combustion signal from the engine ECU. The hybrid electronic control unit 70 terminates the start control routine when it is determined that the torque command Tm1* is equal to 0 after reception of the combustion signal.

The start control of the embodiment calculates the difference between the current torque demand Tr* and the previous torque demand Tr* and determines the presence of the driver's power demand in response to the calculated difference exceeding the preset reference torque level. One modified procedure of start control may calculate a difference between a current accelerator opening Acc and a previous accelerator opening Acc (that is, an increased amount of accelerator depression) and determine the presence of the driver's power demand in response to the calculated difference exceeding a preset reference value.

Figure 10:
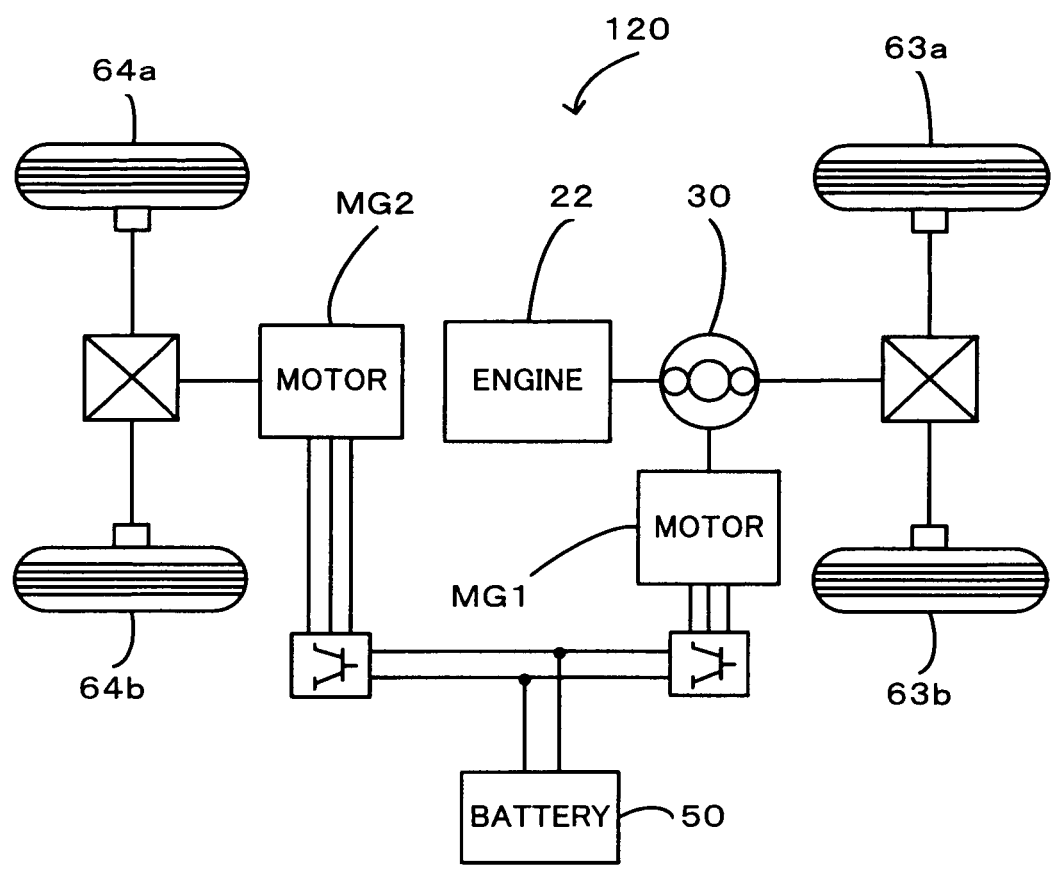
FIG. 10 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention may be applicable to a hybrid vehicle 120 of a modified structure shown in FIG. 10. In the hybrid vehicle 120 of FIG. 10, the power of the motor MG2 is connected to another axle (an axle linked with wheels 64a and 64b) that is different from the axle connecting with the ring gear shaft 32a (the axle linked with the drive wheels 63a and 63b).

The description of the embodiment does not specifically mention the operations of the variable valve timing mechanism 150 at the start of the engine 22 in the hybrid vehicle 20. The preferable operation control delays a valve closing timing of the intake valve 128 to keep the intake valve 128 open even after a shift of the cycle from the intake step to the compression step. Such control effectively prevents generation of a large compression force in the compression step and thus enables a smooth start of the engine 22.

The embodiment regards the hybrid vehicle driven with the powers output from both the internal combustion engine and the motor to the driveshaft. The technique of the invention is not restricted to the hybrid vehicles and is also applicable to various vehicles other than automobiles, for example, trains and boats and ships.

The present application claims the benefit of priority from Japanese Patent Application No. 2005-322617 filed on Nov. 7, 2005, the entire contents of which are incorporated herein by reference.

INDUSTRIAL APPLICABILITY

The technique of the invention is preferably applied to the auto-related industries including general cars, buses, and trucks, as well as to the transport vehicle-related industries including trains, boats and ships, and aircraft.

The invention claimed is:

1. A control method of a hybrid vehicle, the hybrid vehicle including:
    an internal combustion engine that outputs power to a driveshaft linked with an axle of the vehicle; a motoring assembly that is connected to an output shaft of the internal combustion engine via a gear mechanism and motors the internal combustion engine with input and output of torques from and to the driveshaft; and a motor that inputs and outputs power from and to the driveshaft,
    when a start command of the internal combustion engine is given in absence of a driver's power demand in a rotation stop state of the driveshaft, the control method controlling the internal combustion engine, the motoring assembly, and the motor to bring the internal combustion engine into a state of complete explosion and combustion with setting a starting torque of the internal combustion engine to a preset level of chattering control torque in motoring the internal combustion engine by the motoring assembly and to terminate the motoring of the internal combustion engine by the motoring assembly after the complete explosion and combustion in the internal combustion engine.

2. A control method of a hybrid vehicle, the hybrid vehicle including:
    an internal combustion engine that outputs power to a driveshaft linked with an axle of the vehicle; a motoring assembly that is connected to an output shaft of the internal combustion engine via a gear mechanism and motors the internal combustion engine with input and output of torques from and to the driveshaft; and a motor that inputs and outputs power from and to the driveshaft,
    (a) when a start command of the internal combustion engine is given in absence of a driver's power demand in a rotating state of the driveshaft, the control method controlling the internal combustion engine, the motoring assembly, and the motor to bring the internal combustion engine into a state of complete explosion and combustion with setting a starting torque of the internal combustion engine to a preset level of sufficiently small torque in motoring the internal combustion engine by the motoring assembly and to terminate the motoring of the internal combustion engine by the motoring assembly after the complete explosion and combustion in the internal combustion engine, and
    (b) when the start command of the internal combustion engine is given in the absence of the driver's power demand in a rotation stop state of the driveshaft, the control method controlling the internal combustion engine, the motoring assembly, and the motor to bring the internal combustion engine into the state of complete explosion and combustion with setting the starting torque of the internal combustion engine to a chattering control torque, which is greater than the sufficiently small torque, in motoring the internal combustion engine by the motoring assembly and to terminate the motoring of the internal combustion engine by the motoring assembly after the complete explosion and combustion in the internal combustion engine.

3. A hybrid vehicle, comprising:
an internal combustion engine that outputs power to a driveshaft linked with an axle of the vehicle;
a motoring assembly that is connected to an output shaft of the internal combustion engine via a gear mechanism and motors the internal combustion engine with input and output of torques from and to the driveshaft;
a motor that inputs and outputs power from and to the driveshaft;
a driveshaft rotation status detector that detects a rotation status of the driveshaft;
a power demand detector that detects presence or absence of a driver's power demand; and
a start controller that, when a start command of the internal combustion engine is given in the absence of the driver's power demand in a rotation stop state of the driveshaft, controls the internal combustion engine, the motoring assembly, and the motor to bring the internal combustion engine into a state of complete explosion and combustion with setting a starting torque of the internal combustion engine to a preset level of chattering control torque in motoring the internal combustion engine by the motoring assembly and to terminate the motoring of the internal combustion engine by the motoring assembly after the complete explosion and combustion in the internal combustion engine.

4. The hybrid vehicle in accordance with claim 3, wherein when the start command of the internal combustion engine is given in the presence of the driver's power demand, the start controller controls the internal combustion engine, the motoring assembly, and the motor to bring the internal combustion engine into the state of complete explosion and combustion with setting the starting torque of the internal combustion engine to a specific torque exceeding the chattering control torque in motoring the internal combustion engine by the motoring assembly and to terminate the motoring of the internal combustion engine by the motoring assembly after the complete explosion and combustion in the internal combustion engine.

5. The hybrid vehicle in accordance with claim 3, wherein the start controller controls the starting torque of the internal combustion engine according to an ignition timing of the internal combustion engine.

6. The hybrid vehicle in accordance with claim 3, wherein the motoring assembly has:
a three shaft-type power input output mechanism that is linked to three shafts, the output shaft of the internal combustion engine, the driveshaft, and a third shaft, and inputs and outputs power from and to a residual one shaft based on powers input from and output to any two shafts among the three shafts, as the gear mechanism; and
a generator that inputs and outputs power from and to the third shaft.

7. A hybrid vehicle, comprising:
an internal combustion engine that outputs power to a driveshaft linked with an axle of the vehicle;
a motoring assembly that is connected to an output shaft of the internal combustion engine via a gear mechanism and motors the internal combustion engine with input and output of torques from and to the driveshaft;
a motor that inputs and outputs power from and to the driveshaft;
a driveshaft rotation status detector that detects a rotation status of the driveshaft;
a power demand detector that detects presence or absence of a driver's power demand; and
a start controller, when a start command of the internal combustion engine is given in the absence of the driver's power demand in a rotating state of the driveshaft, controls the internal combustion engine, the motoring assembly, and the motor to bring the internal combustion engine into a state of complete explosion and combustion with setting a starting torque of the internal combustion engine to a preset level of sufficiently small torque in motoring the internal combustion engine by the motoring assembly and to terminate the motoring of the internal combustion engine by the motoring assembly after the complete explosion and combustion in the internal combustion engine,
when the start command of the internal combustion engine is given in the absence of the driver's power demand in a rotation stop state of the driveshaft, the start controller controlling the internal combustion engine, the motoring assembly, and the motor to bring the internal combustion engine into the state of complete explosion and combustion with setting the starting torque of the internal combustion engine to a chattering control torque, which is greater than the sufficiently small torque, in motoring the internal combustion engine by the motoring assembly and to terminate the motoring of the internal combustion engine by the motoring assembly after the complete explosion and combustion in the internal combustion engine.

8. The hybrid vehicle in accordance with claim 3, wherein the start controller adopts a specific torque level that prevents repeated contact and separation between teeth of gears in the gear mechanism in response to an internal combustion engine-induced torque variation, as the chattering control torque.

9. The hybrid vehicle in accordance with claim 7, wherein the start controller adopts a specific torque level that is closer to the sufficiently small torque and prevents repeated contact and separation between teeth of gears in the gear mechanism in response to an internal combustion engine-induced torque variation, as the chattering control torque.

10. The hybrid vehicle in accordance with claim 7, wherein the start controller controls the internal combustion engine to adopt a most delayed ignition timing as an ignition timing of the internal combustion engine, so as to set the starting torque of the internal combustion engine to the sufficiently small torque, and
the start controller controls the internal combustion engine to advance the ignition timing of the internal combustion engine from the most delayed ignition timing, so as to set the starting torque of the internal combustion engine to the chattering control torque.

11. The hybrid vehicle in accordance with claim 7, wherein the start controller adopts a specific torque level that prevents repeated contact and separation between teeth of gears in the gear mechanism in response to an internal combustion engine-induced torque variation, as the chattering control torque.

12. The hybrid vehicle in accordance with claim 7, wherein when the start command of the internal combustion engine is given in the presence of the driver's power demand, the start controller controls the internal combustion engine, the motoring assembly, and the motor to bring the internal combustion engine into the state of complete explosion and combustion with setting the starting torque of the internal combustion engine to a specific torque exceeding the chattering control torque in motoring the internal combustion engine by the motoring assembly and to terminate the motoring of the internal combustion engine by the motoring assembly after the complete explosion and combustion in the internal combustion engine.

13. The hybrid vehicle in accordance with claim 7, wherein the start controller controls the starting torque of the internal combustion engine according to an ignition timing of the internal combustion engine.

14. The hybrid vehicle in accordance with claim 7, wherein the motoring assembly has:
- a three shaft-type power input output mechanism that is linked to three shafts, the output shaft of the internal combustion engine, the driveshaft, and a third shaft, and inputs and outputs power from and to a residual one shaft based on powers input from and output to any two shafts among the three shafts, as the gear mechanism; and
- a generator that inputs and outputs power from and to the third shaft.

* * * * *